(12) United States Patent
Yamamoto

(10) Patent No.: US 8,304,373 B2
(45) Date of Patent: *Nov. 6, 2012

(54) SOLID LUBRICANT AND SLIDING MEMBER

(75) Inventor: Yoshiaki Yamamoto, Fujisawa (JP)

(73) Assignee: Oiles Corporation, Tokyo (JP)

( * ) Notice: Subject to any disclaimer, the term of this patent is extended or adjusted under 35 U.S.C. 154(b) by 787 days.

This patent is subject to a terminal disclaimer.

(21) Appl. No.: 10/535,495

(22) PCT Filed: Nov. 20, 2003

(86) PCT No.: PCT/JP03/14801
§ 371 (c)(1),
(2), (4) Date: Jul. 19, 2005

(87) PCT Pub. No.: WO2004/046285
PCT Pub. Date: Jun. 3, 2004

(65) Prior Publication Data
US 2006/0063684 A1 Mar. 23, 2006

(30) Foreign Application Priority Data
Nov. 21, 2002 (JP) ................... 2002-337949

(51) Int. Cl.
*C10M 141/00* (2006.01)
*C10M 157/00* (2006.01)
(52) U.S. Cl. ........ 508/258; 508/181; 508/421; 508/450; 508/451; 508/459; 508/534; 508/591
(58) Field of Classification Search ........... 508/181, 508/419, 421, 429, 433, 441, 446, 447, 448, 508/550, 552, 556, 561, 578, 100, 106, 110, 508/256, 257, 258, 261, 266, 267, 459, 591, 508/534
See application file for complete search history.

(56) References Cited

U.S. PATENT DOCUMENTS

| | | | | |
|---|---|---|---|---|
| 4,575,430 A | * | 3/1986 | Periard et al. | 508/113 |
| 5,173,204 A | * | 12/1992 | Chiddick et al. | 508/167 |
| 5,437,802 A | * | 8/1995 | Kurahashi et al. | 508/116 |
| 5,854,183 A | * | 12/1998 | Hasegawa et al. | 508/316 |
| 6,291,407 B1 | * | 9/2001 | Reidmeyer | 508/114 |
| 6,444,621 B1 | * | 9/2002 | Okaniwa et al. | 508/168 |
| 6,509,099 B1 | * | 1/2003 | Urata et al. | 428/423.1 |
| 6,649,573 B2 | * | 11/2003 | Mitrovich | 508/131 |
| 2002/0072477 A1 | * | 6/2002 | Ikejima et al. | 508/181 |
| 2003/0013615 A1 | * | 1/2003 | Levy | 508/113 |

FOREIGN PATENT DOCUMENTS

| | | | |
|---|---|---|---|
| EP | 1 041 135 A1 | | 10/2000 |
| EP | 1176165 | | 1/2002 |
| JP | 48-27169 | | 4/1973 |
| JP | 51-46668 | | 4/1976 |
| JP | 54-12072 | | 1/1979 |
| JP | 63-72741 | | 4/1988 |
| JP | 02263898 A | * | 10/1990 |
| JP | 6-313186 | | 11/1994 |
| JP | 08073883 A | * | 3/1996 |
| JP | 2001003071 A | * | 1/2001 |

OTHER PUBLICATIONS

International Search Report for PCT/JP03/14801 dated Feb. 24, 2004.

* cited by examiner

*Primary Examiner* — Ellen McAvoy
*Assistant Examiner* — Taiwo Oladapo
(74) *Attorney, Agent, or Firm* — Nixon & Vanderhye P.C.

(57) ABSTRACT

A solid lubricant for being embedded in pores or grooves formed at a sliding surface of a sliding member body, comprises 5 to 30% by volume of a polyethylene resin, 20 to 60% by volume of a hydrocarbon-based wax and 10 to 60% by volume of melamine cyanurate. Such a solid lubricant can exhibit sliding properties identical to or higher than those of lead-containing solid lubricants, even under high load conditions.

12 Claims, No Drawings

SOLID LUBRICANT AND SLIDING MEMBER

This application is the US national phase of international application PCT/JP2003/014801 filed 20 Nov. 2003 which designated the U.S. and claims benefit of JP 2002-337949, filed 21 Nov. 2002, the entire contents of each of which are hereby incorporated by reference.

TECHNICAL FIELD

The present invention relates to a solid lubricant and a sliding member, and more particularly, to a solid lubricant which is embedded in pores or grooves formed at a sliding surface of a sliding member body (a body portion of a sliding member), as well as a sliding member using the solid lubricant.

BACKGROUND ART

Solid lubricants which are embedded in a sliding surface of a sliding member such as bearings, form a thin film on the sliding surface, and exhibit a sliding effect. Therefore, a film-forming capability of the solid lubricants has a large influence on friction coefficient and life of the resultant film. As such solid lubricants, there are known solid lubricants having a layer structure, in particular, those containing graphite as a main component. The graphite exhibits a high resisting force in the direction of load applied thereto, but has a low resisting force in its sliding direction, owing to the layer structure. In addition, the graphite is a soft material and can maintain a good lubrication performance over a broad temperature range of from an ordinary temperature to a high temperature.

However, the solid lubricants containing graphite as a main component tend to be not only insufficient in film-forming capability to some extent, but also unsatisfactory in life of the resultant film when repeatedly exposed to frictional contact. Therefore, the solid lubricants are unsuitable for use in high-load applications.

On the other hand, as the solid lubricants suitably used in high-load applications, there are known such solid lubricants prepared by blending a polytetrafluoroethylene resin, a soft metal such as indium, lead and tin, and a wax with each other. In particular, there have been widely used solid lubricants prepared by blending the ethylene tetrachloride resin, lead and the wax with each other. Such solid lubricants exhibit an extremely low friction coefficient under high-load conditions and an excellent film-forming capability, and a film obtained therefrom has a long life and an excellent self-mending property.

In recent years, lead-free materials tend to be developed in the consideration of avoiding environmental problems. This tendency of the material development has also been present in the field of solid lubricants. However, in the solid lubricants, lead is an important constituent for attaining satisfactory sliding properties. In particular, in the case where the solid lubricant are embedded in pores or grooves formed at the sliding surface of a sliding member such as bearings and used under high-load conditions, lead is important from the standpoint of imparting a good film-forming capability thereto.

For example, in Japanese Patent Application Laid-Open (KOKAI) No. 55-108427(1980), as a lead-free sliding member, there is described the sliding member produced by molding a resin containing an adduct of melamine and isocyanuric acid. However, in the case where the resin composition for the sliding member containing the adduct of melamine and isocyanuric acid is used as a solid lubricant, the friction coefficient thereof tends to be insufficient under high-load conditions. Therefore, it has been demanded to provide a solid lubricant containing no lead and exhibiting sufficient sliding properties even under high-load conditions.

DISCLOSURE OF THE INVENTION

The present invention has been conducted for solving the above problems. An object of the present invention is to provide a lead-free solid lubricant capable of exhibiting sliding properties which are identical to or higher than those of conventional lead-containing solid lubricants, even under high-load conditions.

To accomplish the aim, in a first aspect of the present invention, there is provided a solid lubricant comprising 5 to 30% by volume of a polyethylene resin, 20 to 60% by volume of a hydrocarbon-based wax and 10 to 60% by volume of melamine cyanurate.

In a second aspect of the present invention, there is provided a sliding member comprising a sliding member body having a sliding surface, and the above solid lubricant which is embedded in pores and grooves formed at the sliding surface.

PREFERRED EMBODIMENT FOR CARRYING OUT THE INVENTION

The present invention is described in detail below. The polyethylene resin used in the present invention has a function as a binder. Examples of the polyethylene resin may include a high pressure-processed low-density polyethylene (HPLD), a linear low-density polyethylene (LLDPE), a very low-density polyethylene (VLDPE), a high-density polyethylene (HDPE) or the like.

The high pressure-processed low-density polyethylene (HPLD) is an ethylene homopolymer produced by a high pressure process, and contains long branched chains in addition to short branched chains such as ethyl groups. The density of the high pressure-processed low-density polyethylene is usually 0.910 to 0.940 g/cm$^3$. The linear low-density polyethylene (LLDPE) is a copolymer of ethylene with the other α-olefin such as propylene, buten-1,4-methyl penten-1 and octen-1, which is produced by a medium/low pressure process, and has a density of usually 0.900 to 0.940 g/cm$^3$. Of these copolymers, the polyethylenes having a density of 0.925 to 0.940 g/cm$^3$ are called a medium-density polyethylene (MDPE). The very low-density polyethylene (VLDPE) is obtained by further decreasing the density of the linear low-density polyethylene (LLDPE), and has a density of 0.880 to 0.910 g/cm$^3$. The high-density polyethylene (HDPE) is an ethylene homopolymer produced by a medium/low pressure process, and usually has a density of 0.940 to 0.970 g/cm$^3$.

The amount of the polyethylene resin blended is 5 to 30% by volume, preferably 10 to 25% by volume. When the amount of the polyethylene resin blended is less than 5% by volume, the polyethylene resin may fail to exhibit a sufficient effect as a binder. When the amount of the polyethylene resin blended is more than 30% by volume, the amounts of the hydrocarbon-based wax and the melamine cyanurate are comparatively small, so that it may be difficult to cause the resultant solid lubricant to show good sliding properties.

The hydrocarbon-based wax used in the present invention has an effect for decreasing a friction coefficient. Examples of the hydrocarbon-based wax may include paraffin waxes, polyethylene waxes, microcrystalline waxes or the like. These hydrocarbon-based waxes may be used singly or in the form of a mixture of any two or more thereof.

The amount of the hydrocarbon-based wax blended is 20 to 60% by volume, preferably 25 to 45% by volume. When the amount of the hydrocarbon-based wax blended is less than 20% by volume, the resultant solid lubricant may fail to show the aimed low friction characteristics. On the other hand, when the amount of the hydrocarbon-based wax blended is more than 60% by volume, the resultant solid lubricant tends to be deteriorated in moldability, and the molded product obtained therefrom tends to be deteriorated in strength.

The melamine cyanurate used in the present invention is an adduct of melamine with cyanuric acid or isocyanuric acid, and has such a structure that melamine molecules and cyanuric acid (or isocyanuric acid) molecules respectively having a 6-membered ring structure are arranged in plane through a hydrogen bond to form overlapped layers bonded to each other by a weak force. Therefore, it is considered that the melamine cyanurate show a cleavage property similarly to molybdenum disulfide or graphite. The melamine cyanurate has an effect of enhancing a wear resistance and a load carrying capacity. The amount of the melamine cyanurate blended is 10 to 60% by volume, preferably 20 to 50% by volume. When the amount of the melamine cyanurate blended is less than 10% by volume, it may be difficult to attain the aimed effect of enhancing a wear resistance and a load carrying capacity. On the other hand, when the amount of the melamine cyanurate blended is more than 60% by volume, the resultant solid lubricant tends to be deteriorated in sliding properties.

The solid lubricant of the present invention may further contain, as additional components, higher-fatty acids, esters of higher-fatty acids (higher-fatty esters), amides of higher-fatty acids (higher-fatty amides), metallic soaps, phosphates and/or high-molecular weight polytetrafluoroethylene resins.

As the higher-fatty acids, there may be used saturated or unsaturated aliphatic acids having 12 or more carbon atoms. Specific examples of the higher-fatty acids may include lauric acid, myristic acid, palmitic acid, stearic acid, arachic acid, behenic acid, cerotic acid, montanic acid, melissic acid, lauroleic acid, myristoleic acid, oleic acid, elaidic acid, linoleic acid, linolenic acid, arachidonic acid, gadoleic acid and erucic acid.

The higher-fatty esters are esters of the above higher-fatty acids with monohydric or polyhydric alcohols. Examples of the monohydric alcohols may include capryl alcohol, lauryl alcohol, myristyl alcohol, palmityl alcohol, stearyl alcohol and behenyl alcohol. Examples of the polyhydric alcohols may include ethylene glycol, propylene glycol, butane diol, glycerol, pentaerythritol and sorbitan. Specific examples of the higher-fatty esters may include stearyl stearate, pentaerythritol tetrastearate, stearic monoglyceride, behenic monoglyceride and montan waxes.

The higher-fatty amides are amides of the above higher-fatty acids with monoamines or polyamines. Examples of the monoamines or polyamines may include capryl amine, lauryl amine, myristyl amine, palmityl amine, stearyl amine, methylenediamine, ethylenediamine and hexamethylenediamine. Specific examples of the higher-fatty amides may include stearamide, oleamide and erucamide.

These higher-fatty acids, higher-fatty esters and higher-fatty amides have an effect of not only decreasing a friction coefficient but also enhancing a moldability, and may be used singly or in the form of a mixture of any two or more thereof. The amount of the higher-fatty acids, higher-fatty esters and higher-fatty amides blended is usually 1 to 10% by volume, preferably 3 to 10% by volume. When the amount of the higher-fatty acids, higher-fatty esters and higher-fatty amides blended is less than 1% by volume, it may be difficult to attain the aimed effect of decreasing a friction coefficient and enhancing a moldability. When the amount of the higher-fatty acids, higher-fatty esters and higher-fatty amides blended is more than 10% by volume, the resultant solid lubricant tends to be deteriorated in moldability.

The metallic soap is a salt of the above higher-fatty acids with alkali metals or alkali earth metals. Specific examples of the metallic soap may include lithium stearate and calcium stearate. These metallic soaps have an effect of not only decreasing a friction coefficient but also enhancing a thermal stability. The amount of the metallic soap blended is usually 3 to 20% by volume, preferably 5 to 15% by volume. When the amount of the metallic soap blended is less than 3% by volume, it may be difficult to attain the aimed effect of decreasing a friction coefficient and enhancing a thermal stability. On the other hand, when the amount of the metallic soap blended is more than 20% by volume, the resultant solid lubricant tends to be deteriorated in moldability.

As the phosphate, there may be used tertiary phosphates, secondary phosphates, pyrophosphates, phosphites or metaphosphates of alkali metals or alkali earth metals. Specific examples of the phosphates may include trilithium phosphate, dilithium hydrogenphosphate, lithium pyrophosphate, tricalcium phosphate, calcium monohydrogenphosphate, calcium pyrophosphate, lithium metaphosphate, magnesium metaphosphate and calcium metaphosphate.

The phosphates themselves have no lubrication property, but can exhibit an effect of promoting formation of a lubricant film on the surface of a mating member upon sliding thereon, so that it is possible to always form and hold a good lubricant film on the surface of the mating member, thereby maintaining good sliding properties. The amount of the phosphate blended is usually 3 to 15% by volume, preferably 5 to 10% by volume. When the amount of the phosphate blended is less than 3% by volume, it may be difficult to exhibit the aimed effect. On the other hand, when the amount of the phosphate blended is more than 15% by volume, the amount of the lubricant film transferred and attached onto the surface of the mating member tends to be excessively large, so that the resultant sliding member tends to be deteriorated in wear resistance.

In the case where at least two compound selected from the group consisting of the higher-fatty acids, higher-fatty esters, higher-fatty amides, metallic soaps and phosphates are used in combination, a total amount of these components is preferably not more than 30% by volume. When the total amount of these components is more than 30% by volume, the resultant molded product tends to be insufficient in strength.

The high-molecular weight polytetrafluoroethylene resin is used mainly for molding purposes in the form of a molding powder or a fine powder, and represents such an polytetrafluoroethylene resin that is formed into fibers upon applying a shear force thereto (hereinafter referred to merely as "PTFE"). The high-molecular weight PTFE may be directly used in an unbaked state, or may be used in the form of particles obtained by baking the PTFE at a temperature not less than a melting point thereof and then pulverizing the baked product. Specific examples of the high-molecular weight PTFE may include "TEFLON (registered trademark) 7-J", "TEFLON (registered trademark) 7A-J", "TEFLON (registered trademark) 6-J" and "TEFLON (registered trademark) 6C-J", all produced by Du Pont-Mitsui Fluorochemical Co., Ltd.; "POLYFLON M-12 (tradename)" and "POLYFLON F-201 (tradename)", both produced by Daikin Industries, Ltd.; "FLUON G-163 (tradename)", "FLUON G-190 (tradename)", "FLUON CD076 (tradename)" and "FLUON CD090 (tradename)", all produced by Asahi Glass Co., Ltd.; "KT-300M (tradename)" produced by Kitamura Limited, or the like. Further, in addition to the above products, there may also be used PTFE modified with styrene-based polymers, acrylic ester-based polymers, methacrylic ester-based polymers, acrylonitrile-based polymers, etc. Specific examples of the modified PTFE may include "METABLEN A-3000 (tradename)" produced by Mitsubishi Rayon Co., Ltd., or the like.

The high-molecular weight PTFE has an effect of enhancing a toughness of the solid lubricant. More specifically, the high-molecular weight PTFE can effectively prevent the solid lubricant embedded in pores or grooves formed at the sliding surface of the sliding member body from being broken-off or fallen-off therefrom upon machining the solid lubricant embedded in the sliding member body (body portion of the sliding member) or upon using the sliding member. The amount of the high-molecular weight PTFE blended is usually 0.5 to 10% by volume, preferably 0.5 to 5% by volume. When the amount of the high-molecular weight PTFE blended is less than 0.5% by volume, it may be difficult to attain the aimed effect of the high-molecular weight PTFE. On the other hand, when the amount of the high-molecular weight PTFE blended is more than 10% by volume, the resultant solid lubricant tends to be deteriorated in sliding properties and moldability.

The solid lubricant of the present invention can be produced by mixing the above respective components with each other at a predetermined mixing ratio using a mixer such as a Henschel mixer, a Super mixer, a ball mill and a tumbler, and then molding the resultant mixture into a desired shape. The molding method is not particularly limited, and there may be usually used such a molding method in which the obtained mixture is fed to an extruder and melt-kneaded therein at a temperature capable of melting the hydrocarbon-based wax to prepare pellets, and then the obtained pellets are fed to an injection-molding machine and injection-molded therefrom at a temperature not less than a softening point of the polyethylene resin as a binder.

The sliding member of the present invention comprises a sliding member body composed of metal materials, etc., and a solid lubricant embedded in pores or grooves formed at a sliding surface of the sliding member body. The solid lubricant may be fixed in the pores or grooves, for example, using an adhesive agent.

The thus obtained solid lubricant can exhibit sliding properties that are identical to or higher than those of conventional lead-containing solid lubricants, even under high load conditions.

EXAMPLES

The present invention is described in more detail by Examples, but the Examples are only illustrative and not intended to limit the scope of the present invention. Various sliding properties used in Examples and Comparative Examples were measured by the following methods.

<Sliding Properties>

The obtained solid lubricant was embedded in pores formed at a sliding surface to prepare a sliding member test specimen. The obtained test specimen was subjected to a thrust test to measure a friction coefficient and a wear amount thereof. The testing conditions are shown in Table 1.

TABLE 1

| Material of test specimen | High strength brass fourth-class casting |
|---|---|
| Material of mating member | Stainless steel (SUS304) |
| Area ratio occupied by solid lubricant in sliding surface | 30% |
| Sliding velocity | 1 m/min |
| Load | 300 kgf/cm$^2$ |
| Lubrication | None |
| Testing time | 8 hr |

Example 1

28% by volume of a linear low-density polyethylene "ULTZEX (tradename)" (produced by Mitsui Chemicals Inc.) as a polyethylene resin, 21% by volume of a paraffin wax and 21% by volume of a polyethylene wax as a hydrocarbon-based wax, and 30% by volume of melamine cyanurate "MCA (tradename)" (produced by Mitsubishi Chemical Corporation) were introduced into a Henschel mixer and mixed with each other therein. The resultant mixture was melt-kneaded using an extruder at a temperature capable of melting the hydrocarbon-based wax, thereby producing pellets. Next, the obtained pellets were fed into an injection-molding machine and injection-molded at a temperature not less than a softening point of the polyethylene resin, thereby producing a cylindrical solid lubricant having a diameter of 6 mm and a length of 5 mm. Various sliding properties of the obtained solid lubricant are shown in Table 2.

Examples 2 to 20

The same procedure as defined in Example 1 was conducted except that the composition was variously changed as shown in Tables 2 to 8, thereby producing a cylindrical solid lubricant having a diameter of 6 mm and a length of 5 mm. Various sliding properties of the obtained solid lubricants are shown in Tables 2 to 8.

Comparative Examples 1 to 3

The same procedure as defined in Example 1 was conducted except that the composition was variously changed as shown in Table 9, thereby producing a cylindrical solid lubricant having a diameter of 6 mm and a length of 5 mm. Various sliding properties of the obtained solid lubricants are shown in Table 9.

TABLE 2

| | Examples | | |
|---|---|---|---|
| | 1 | 2 | 3 |
| Composition | | | |
| LLDPE | 28 | 24 | 20 |
| HDPE | — | — | — |
| HPLD | — | — | — |
| Paraffin wax | 21 | 18 | 15 |
| Polyethylene wax | 21 | 18 | 15 |
| Melamine cyanurate | 30 | 40 | 50 |
| Montanic acid | — | — | — |
| Stearamide | — | — | — |
| Montan wax | — | — | — |
| Lithium stearate | — | — | — |
| Trilithium phosphate | — | — | — |
| Calcium pyrophosphate | — | — | — |

TABLE 2-continued

|  | Examples | | |
|---|---|---|---|
|  | 1 | 2 | 3 |
| Various properties | | | |
| Friction coefficient | 0.110 | 0.100 | 0.100 |
| Wear amount (µm) | 15 | 10 | 15 |

TABLE 3

|  | Examples | | |
|---|---|---|---|
|  | 4 | 5 | 6 |
| Composition | | | |
| LLDPE | 10 | 20 | 20 |
| HDPE | — | — | — |
| HPLD | — | — | — |
| Paraffin wax | 25 | 30 | 15 |
| Polyethylene wax | 25 | — | 15 |
| Melamine cyanurate | 40 | 45 | 47 |
| Montanic acid | — | 5 | 3 |
| Stearamide | — | — | — |
| Montan wax | — | — | — |
| Lithium stearate | — | — | — |
| Trilithium phosphate | — | — | — |
| Calcium pyrophosphate | — | — | — |
| Various properties | | | |
| Friction coefficient | 0.065 | 0.075 | 0.090 |
| Wear amount (µm) | 3 | 3 | 7 |

TABLE 4

|  | Examples | | |
|---|---|---|---|
|  | 7 | 8 | 9 |
| Composition | | | |
| LLDPE | 20 | 20 | 20 |
| HDPE | — | — | — |
| HPLD | — | — | — |
| Paraffin wax | 15 | 15 | 15 |
| Polyethylene wax | 15 | 15 | 15 |
| Melamine cyanurate | 45 | 40 | 35 |
| Montanic acid | 5 | 10 | — |
| Stearamide | — | — | — |
| Montan wax | — | — | — |
| Lithium stearate | — | — | 15 |
| Trilithium phosphate | — | — | — |
| Calcium pyrophosphate | — | — | — |
| Various properties | | | |
| Friction coefficient | 0.095 | 0.105 | 0.100 |
| Wear amount (µm) | 3 | 10 | 10 |

TABLE 5

|  | Examples | | |
|---|---|---|---|
|  | 10 | 11 | 12 |
| Composition | | | |
| LLDPE | 20 | — | 20 |
| HDPE | — | 20 | — |
| HPLD | — | — | — |
| Paraffin wax | 15 | 15 | 15 |
| Polyethylene wax | 15 | 15 | 15 |
| Melamine cyanurate | 47 | 45 | 40 |
| Montanic acid | — | 5 | 5 |
| Stearamide | — | — | — |
| Montan wax | — | — | — |
| Lithium stearate | — | — | 5 |
| Trilithium phosphate | 3 | — | — |
| Calcium pyrophosphate | — | — | — |
| Various properties | | | |
| Friction coefficient | 0.100 | 0.100 | 0.090 |
| Wear amount (µm) | 10 | 15 | 11 |

TABLE 6

|  | Examples | | |
|---|---|---|---|
|  | 13 | 14 | 15 |
| Composition | | | |
| LLDPE | 20 | 20 | — |
| HDPE | — | — | — |
| HPLD | — | — | 20 |
| Paraffin wax | 15 | 15 | 15 |
| Polyethylene wax | 15 | 15 | 15 |
| Melamine cyanurate | 40 | 35 | 35 |
| Montanic acid | 5 | 5 | 5 |
| Stearamide | — | — | — |
| Montan wax | — | — | — |
| Lithium stearate | — | 5 | 5 |
| Trilithium phosphate | 5 | 5 | — |
| Calcium pyrophosphate | — | — | 5 |
| Various properties | | | |
| Friction coefficient | 0.100 | 0.090 | 0.090 |
| Wear amount (µm) | 5 | 2 | 3 |

TABLE 7

|  | Examples | |
|---|---|---|
|  | 16 | 17 |
| Composition | | |
| LLDPE | 10 | 20 |
| HDPE | — | — |
| HPLD | — | — |
| Paraffin wax | 15 | 15 |
| Polyethylene wax | 35 | 15 |
| Melamine cyanurate | 30 | 20 |
| Montanic acid | 5 | 5 |
| Stearamide | — | 5 |
| Montan wax | — | — |
| Lithium stearate | — | 10 |
| Trilithium phosphate | 5 | 10 |
| Calcium pyrophosphate | — | — |
| Various properties | | |
| Friction coefficient | 0.090 | 0.100 |
| Wear amount (µm) | 2 | 7 |

TABLE 8

| | Examples | | |
|---|---|---|---|
| | 18 | 19 | 20 |
| Composition | | | |
| LLDPE | — | — | — |
| HDPE | — | — | — |
| HPLD | 20 | 20 | 20 |
| Paraffin wax | 12.5 | 12.5 | 12.5 |
| Polyethylene wax | 12.5 | 12.5 | 12.5 |
| Melamine cyanurate | 34 | 32 | 30 |
| Montanic acid | — | — | — |
| Stearamide | — | — | — |
| Montan wax | 5 | 5 | 5 |
| Lithium stearate | 10 | 10 | 10 |
| Trilithium phosphate | 5 | 5 | 5 |
| Calcium pyrophosphate | — | — | — |
| High-molecular weight PTFE | 1 | 3 | 5 |
| Various properties | | | |
| Friction coefficient | 0.080 | 0.090 | 0.100 |
| Wear amount (μm) | 2 | 4 | 7 |

TABLE 9

| | Comparative Examples | | |
|---|---|---|---|
| | 1 | 2 | 3 |
| Composition | | | |
| LLDPE | 50 | 50 | — |
| HDPE | — | — | — |
| HPLD | — | — | 10 |
| Paraffin wax | 50 | — | 13 |
| Polyethylene wax | — | — | — |
| Melamine cyanurate | — | 50 | — |
| Montanic acid | — | — | — |
| Stearamide | — | — | — |
| Montan wax | — | — | — |
| Lithium stearate | — | — | 7 |
| Trilithium phosphate | — | — | — |
| Calcium pyrophosphate | — | — | — |
| Lead | — | — | 40 |
| Low-molecular weight PTFE | — | — | 30 |
| Various properties | | | |
| Friction coefficient | 0.145 | >0.2 | 0.095 |
| Wear amount (μm) | 25 | — | 9 |

In the above Tables, as HDPE, there was used "HI-ZEX (tradename)" produced by Mitsui Chemicals Inc.; as HPLD, there was used "MIRASON (tradename)" produced by Mitsui Chemicals Inc.; as high-molecular weight PTFE, there was used "KT-300M (tradename)" produced by Kitamura Limited; and as low-molecular weight PTFE, there was used "TLP-10F (tradename)" produced by Du Pont-Mitsui Fluorochemical Co., Ltd.

As apparently recognized from the above results, it was confirmed that the sliding member obtained by embedding the solid lubricant of the present invention in the sliding member body exhibited excellent sliding properties that were identical to or higher than those of the sliding member in which the conventional lead-containing solid lubricant obtained in Comparative Example 3 was embedded. On the other hand, it was confirmed that the sliding member having a sliding surface in which the solid lubricant containing no melamine cyanurate as obtained in Comparative Example 1 was embedded, exhibited a high friction coefficient, a large wear amount and poor sliding properties; and the sliding member having a sliding surface in which the solid lubricant containing no hydrocarbon-based wax as obtained in Comparative Example 2 was embedded, exhibited a friction coefficient as high as more than 0.2 in the course of the thrust test, resulting interruption of the thrust test.

INDUSTRIAL APPLICABILITY

According to the present invention, there can be provided a lead-free solid lubricant capable of exhibiting sliding properties identical to or higher than those of conventional lead-containing solid lubricants, even under high load conditions, as well as a sliding member using the solid lubricant.

The invention claimed is:

1. A sliding member comprising a sliding member body, and a solid lubricant comprising 5 to 24% by volume of a polyethylene resin, 20 to 60% by volume of a hydrocarbon-based wax, 20 to 60% by volume of melamine cyanurate, and at least one compound selected from the group consisting of higher-fatty acids, higher-fatty esters and higher-fatty amides in an amount of 1 to 10% by volume, the solid lubricant having a friction coefficient of not more than 0.100,
   which is embedded in pores and grooves formed at the sliding surface of the sliding member body.

2. The sliding member according to claim 1, wherein said hydrocarbon-based wax in the solid lubricant is at least one material selected from the group consisting of paraffin waxes, polyethylene waxes and microcrystalline waxes.

3. The sliding member according to claim 1, wherein the solid lubricant further comprises as an additional component, a metallic soap in an amount of 3 to 20% by volume.

4. The sliding member according to claim 1, wherein the solid lubricant further comprises as an additional component, a high-molecular weight polytetrafluoroethylene resin in an amount of 0.5 to 10% by volume.

5. A sliding member comprising a sliding member body, and a solid lubricant comprising 5 to 24% by volume of a polyethylene resin, 20 to 60% by volume of a hydrocarbon-based wax, 20 to 60% by volume of melamine cyanurate, and a phosphate in an amount of 3 to 15% by volume, the solid lubricant having a friction coefficient of not more than 0.100,
   which is embedded in pores and grooves formed at the sliding surface of the sliding member body.

6. The sliding member according to claim 5, wherein said hydrocarbon-based wax in the solid lubricant is at least one material selected from the group consisting of paraffin waxes, polyethylene waxes and microcrystalline waxes.

7. The sliding member according to claim 5, wherein the solid lubricant further comprises as an additional component, a metallic soap in an amount of 3 to 20% by volume.

8. The sliding member according to claim 5, wherein the solid lubricant further comprises as an additional component, a high-molecular weight polytetrafluoroethylene resin in an amount of 0.5 to 10% by volume.

9. A sliding member comprising a sliding member body, and a solid lubricant comprising 5 to 24% by volume of a polyethylene resin, 20 to 60% by volume of a hydrocarbon-based wax, 20 to 60% by volume of melamine cyanurate, at least one compound selected from the group consisting of higher-fatty acids, higher-fatty esters and higher-fatty amides in an amount of 1 to 10% by volume and a phosphate in an amount of 3 to 15% by volume, the solid lubricant having a fried coefficient of not more than 0.100,
   which is embedded in pores and grooves formed at the sliding surface of the sliding member body.

10. The sliding member according to claim 9, wherein said hydrocarbon-based wax in the solid lubricant is at least one material selected from the group consisting of paraffin waxes, polyethylene waxes and microcrystalline waxes.

11. The sliding member according to claim 9, wherein the solid lubricant further comprises as an additional component, a metallic soap in an amount of 3 to 20% by volume.

12. The sliding member according to claim 9, wherein the solid lubricant further comprises as an additional component, a high-molecular weight polytetrafluoroethylene resin in an amount of 0.5 to 10% by volume.

* * * * *